US009698587B2

(12) United States Patent
Katsuramaki et al.

(10) Patent No.: US 9,698,587 B2
(45) Date of Patent: Jul. 4, 2017

(54) FLAT CABLE REELING DEVICE

(71) Applicant: YAZAKI CORPORATION, Tokyo (JP)

(72) Inventors: Takahiko Katsuramaki, Shizuoka (JP); Ryo Hamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 85 days.

(21) Appl. No.: 14/772,184

(22) PCT Filed: Mar. 13, 2014

(86) PCT No.: PCT/JP2014/056643
§ 371 (c)(1),
(2) Date: Sep. 2, 2015

(87) PCT Pub. No.: WO2014/142232
PCT Pub. Date: Sep. 18, 2014

(65) Prior Publication Data
US 2016/0013627 A1    Jan. 14, 2016

(30) Foreign Application Priority Data

Mar. 14, 2013 (JP) ................. 2013-052040

(51) Int. Cl.
*B65H 75/44* (2006.01)
*H02G 11/02* (2006.01)
(Continued)

(52) U.S. Cl.
CPC ............. *H02G 11/02* (2013.01); *B65H 75/28* (2013.01); *B65H 75/4471* (2013.01); *B65H 75/48* (2013.01); *B65H 2701/34* (2013.01)

(58) Field of Classification Search
CPC ............ B65H 75/4434; B65H 75/4471; H01R 35/025; H01R 2201/26
See application file for complete search history.

(56) References Cited

U.S. PATENT DOCUMENTS 5,277,604 A     1/1994 Ida et al.
9,409,746 B2 *  8/2016 Hamada ................. B65H 75/44
(Continued)

FOREIGN PATENT DOCUMENTS

JP        4-310445 A      11/1992
JP        2004-328985 A   11/2004
JP        2012-115008 A    6/2012

OTHER PUBLICATIONS

International Search Report and Written Opinion of the International Search Report for PCT/JP2014/056643 dated Apr. 22, 2014.

*Primary Examiner* — Sang Kim
(74) *Attorney, Agent, or Firm* — Kenealy Vaidya LLP

(57) ABSTRACT

An object of the present invention is to provide a flat cable reeling device reducing a size. A flat cable reeling device includes a case housing a flat cable, a center shaft provided in the case and fixing a first end side of the flat cable, a rotating table rotatively provided, centering on the center shaft, and a biasing means biasing the rotating table in a reeling direction of the flat cable. The rotating table is provided with a plurality of rollers adapted to reel the flat cable from an outside of the case along a circumferential direction of the rotating table. The rotating table is integrally provided with a disk-like table main body and a plurality of guiding portions formed to project from an upper surface of the table main body, and the plurality of guiding portions rotatively support the respective rollers and guide the respective rollers to be slidable in a radial direction of the rotating table.

3 Claims, 5 Drawing Sheets

(51) Int. Cl.
*B65H 75/48* (2006.01)
*B65H 75/28* (2006.01)

(56) References Cited

U.S. PATENT DOCUMENTS

| | | | | |
|---|---|---|---|---|
| 2009/0317984 | A1* | 12/2009 | Oishi | B60R 16/027 |
| | | | | 439/34 |
| 2013/0248632 | A1 | 9/2013 | Hamada | |
| 2014/0353415 | A1* | 12/2014 | Katsuramaki | H02G 11/02 |
| | | | | 242/371 |
| 2015/0001327 | A1* | 1/2015 | Hamada | B65H 75/44 |
| | | | | 242/376 |

* cited by examiner

FLAT CABLE REELING DEVICE

TECHNICAL FIELD

The present invention relates to a flat cable reeling device reeling a first end side of a flat cable and unreeling a second end side thereof.

BACKGROUND ART

For example, in a car or the like, a sliding seat, a sliding door, and the like slidably provided to a vehicle are used. The sliding seat is provided with electronic components such as a seating sensor detecting whether or not an occupant is seated and a seat belt sensor detecting whether or not a seat belt is fastened, and the sliding door is provided with electronic components such as a driving motor adapted to drive a door window for opening/closing and a door courtesy lamp adapted to illuminate the occupant's feet when a door is opened. For this reason, in the vehicle provided with a sliding body such as the sliding seat and the sliding door, various wire routing devices or power feeding devices routing wires between the vehicle and the sliding body are used to connect the electronic components on the sliding body side with electronic components such as a control unit provided on the vehicle side.

In such a wire routing device, since the wire connecting the electronic component on the sliding body side with the electronic component on the vehicle side (e.g., a wire called a flat cable or a flat harness) has an extra length part formed along with sliding of the sliding body, a reeling device is used to reel this extra length part of the wire to prevent the wire from interfering with the sliding body or the like (e.g., refer to Patent Literature 1). As illustrated in FIGS. 6A and 6B, a conventional flat cable reeling device 100 described in Patent Literature 1 is a device enabling a first end side of a flat cable C to be reeled and a second end side to be unreeled and includes a case 101 entirely formed approximately in a cylindrical shape, an inside annular wall 102 provided in the case 101 and holding the first end side of the flat cable C, a rotor 103 guided by this inside annular wall 102 and provided to be rotatable, and a coil spring 104 biasing this rotor 103 in a reeling direction R of the flat cable C. The rotor 103 is provided with shaft portions 103A projecting from an upper surface of the rotor 103 arranged along a circumferential direction thereof, and a plurality of rollers 105 are rotatively supported by the shaft portions 103A.

In this reeling device 100, the first end side of the flat cable C led in the case 101 is inverted on one of the plurality of rollers 105 and is held in the inside annular wall 102 while the second end side of the flat cable C is led out of the case 101. The reeling device 100 is configured to cause the rotor 103 to be rotated in the reeling direction R by a biasing force of the coil spring 104 to wind the flat cable C around the inside annular wall 102 and wind the flat cable C on outer circumferences of the plurality of rollers 105, thus to reel the flat cable C. Conversely, in a case in which the second end side of the flat cable C is pulled along with sliding of the sliding body, the rotor 103 is rotated in a reverse direction of the reeling direction R, the flat cable C wound around the inside annular wall 102 and the plurality of rollers 105 is unwound, to enable the flat cable C to be unreeled outside the case 101.

A reeling structure of this kind is proposed in Japanese Patent Application No. 2012-031397 by the present applicant. This reeling structure includes the rollers 105 each including two members consisting of a cylindrical roller main body and a boss inserted in a hole of this roller main body and a retaining groove formed in a recessed shape from an upper surface of the rotor 103 and retaining a lower end portion of the boss to cause the rollers 105 to be slidable in a radial direction of the rotor 103. When the flat cable C is reeled in such a reeling structure, the rotor 103 is rotated in the reeling direction R by the biasing force of the coil spring 104, and when the flat cable C is wound on the outer circumferences of the plurality of rollers 105, the respective rollers 105 are pressed to a side of the flat cable C wound around the inside annular wall 102, and the plurality of rollers 105 pressed by the flat cable C are moved inward in the radial direction of the rotor 103. The flat cable is reeled and unreeled in this state. Thus, when the flat cable C is unreeled, for example, the rollers 105 are rotated while feeding the flat cable C, and the flat cable C unwound around the inside annular wall 102 is forcibly fed to a side of the outer circumferences of the rollers 105. This restricts slack of the flat cable C generated around the inside annular wall 102.

However, since the aforementioned reeling structure is configured so that the lower end portion of the boss may be retained at the retaining groove formed in the recessed shape from the upper surface of the rotor 103 to cause the boss to slide, there is a problem in which the reeling structure is larger than the reeling device 100 described in Patent Literature 1 by a height dimension of the retaining groove. Also, since the shaft portions 103A are provided separately from the rotor 103 in the reeling structure, there is a problem in which the number of parts is larger than that in the reeling device 100.

CITATION LIST

Patent Literature

Patent Literature 1: JP 2004-328985 A

SUMMARY OF INVENTION

Technical Problem

An object of the present invention is to provide a flat cable reeling device reducing a size in a height direction and reducing the number of parts.

Solution to Problem

One aspect of the present invention is a flat cable reeling device reeling a first end side of a flat cable and leading out a second end side thereof, including: a case housing the flat cable; a center shaft provided in the case and fixing the first end side of the flat cable; a rotating table rotatively provided, centering on the center shaft; a plurality of rollers adapted to reel the flat cable from an outside of the case; and a biasing means biasing the rotating table in a reeling direction of the flat cable, wherein the rotating table is integrally provided with a disk-like table main body and a plurality of guiding portions formed to project from an upper surface of the table main body, the table main body is provided with the plurality of rollers adapted to reel the flat cable from the outside of the case arranged along a circumferential direction of the table main body, and the plurality of guiding portions are provided at respective positions at which the respective rollers are arranged, rotatively support the respective rollers, and guide the respective rollers to be slidable in a radial direction of the rotating table.

A first preferred aspect of the present invention is the flat cable reeling device according to the one aspect of the present invention, wherein each of the rollers integrally includes a shaft portion as a rotation center, each of the guiding portions includes a pair of supporting portions inserting the shaft portion therebetween and rotatively supporting the shaft portion, and the pair of supporting portions is provided to extend in a direction parallel to the radial direction of the rotating table.

A second preferred aspect of the present invention is the flat cable reeling device according to the first preferred aspect of the present invention, wherein the roller is configured to integrally include a disk portion, a circumferential wall erected in a cylindrical shape from a circumference of the disk portion, and the shaft portion erected in a columnar shape from the disk portion in the same direction to that of the circumferential wall, and each of the supporting portions as the pair includes an opposed surface opposed in a direction perpendicular to the radial direction of the rotating table and inserting the shaft portion therebetween and an arc-like sliding surface provided to continue into the opposed surface and sliding on an inner circumferential surface of the circumferential wall.

Advantageous Effects of Invention

According to the one aspect of the present invention, the rotating table is integrally provided with the disk-like table main body and the plurality of guiding portions formed to project from the upper surface of the table main body, the table main body is provided with the plurality of rollers adapted to reel the flat cable from the outside of the case arranged along the circumferential direction of the table main body, and the plurality of guiding portions are provided at the respective positions at which the respective rollers are arranged, rotatively support the respective rollers, and guide the respective rollers to be slidable in the radial direction of the rotating table. Accordingly, the respective rollers are guided to be slidable by the plurality of guiding portions formed to project from the upper surface of the table main body, this can dispense with the retaining groove formed in the recessed shape from the upper surface of the rotor in the conventional sliding mechanism, and size reduction of the flat cable reeling device in an up-down direction can be achieved as much as the omission of the retaining groove. Also, the rotating table integrally includes the disk-like table main body and the plurality of guiding portions formed to project from the upper surface of the table main body, and this means the sliding mechanism of the roller is achieved by two members: the rotating table and the roller. Thus, the number of parts can be reduced further than in the conventional reeling mechanism, in which the sliding mechanism is achieved by three members: the roller main body, the shaft portion, and the rotor, and assembling operability can be improved. Also, omitting the retaining groove can facilitate forming of the rotating table and improve dust proofing.

According to the first preferred aspect of the present invention, each of the rollers integrally includes the shaft portion as the rotation center, each of the guiding portions includes the pair of supporting portions inserting the shaft portion therebetween and rotatively supporting the shaft portion, and the pair of supporting portions is provided to extend in the direction parallel to the radial direction of the rotating table. Accordingly, the configuration in which the shaft portion is rotatively supported and is guided to be slidable in the radial direction of the rotating table can be achieved by the pair of supporting portions without increasing the number of parts.

According to the second preferred aspect of the present invention, the roller is configured to integrally include the disk portion, the circumferential wall erected in the cylindrical shape from the circumference of the disk portion, and the shaft portion erected in the columnar shape from the disk portion in the same direction as that of the circumferential wall, and each of the supporting portions as the pair includes the opposed surface opposed in the direction perpendicular to the radial direction of the rotating table and the arc-like sliding surface provided to continue into the opposed surface and sliding on the inner circumferential surface of the circumferential wall. Accordingly, the shaft portion is rotated and slides on the opposed surface, and the inner circumferential surface of the circumferential wall slides on the sliding surface, thus to make rotation and sliding movement of the roller smooth.

DESCRIPTION OF EMBODIMENTS

Hereinbelow, an exemplary embodiment of a flat cable reeling device according to the present invention will be described with reference to FIGS. 1 to 5. A flat cable reeling device 1 reels a flat cable 2 routed between a sliding seat slidably provided to a floor of a vehicle or the like and the vehicle, for example. A first end of the flat cable 2 is connected with a connector or the like provided on a side of the floor while a second end side of the flat cable 2 is guided to a protector P guided along a sliding rail and is connected with a connector or the like on a side of the sliding seat via this protector P. This flat cable reeling device 1 is provided close to the sliding rail. The flat cable reeling device 1 reels the flat cable 2 along with approaching movement of the protector P and unreels the flat cable 2 along with separating movement of the protector P to prevent slack of the flat cable 2 between the reeling device 1 and the protector P, thus to prevent the flat cable 2 from interfering with the sliding seat and the like.

The flat cable 2 includes a plurality of core wires parallel to each other and insulating covers covering the respective core wires and is formed in a flexible thin strip shape. Each core wire is formed by twisting a plurality of conductive wires, and each cover is made of a synthetic resin. This flat cable 2 is formed to be sufficiently longer than a sliding distance of the sliding seat, and a first end side 2A (illustrated in FIG. 1) thereof passes through an inside of the reeling device 1 and is then pulled outside to be connected with the connector or the like on the floor side while a second end side 2B thereof is connected with the connector or the like on the sliding seat side via the protector P. Meanwhile, although a case of using the flat cable 2 having the plurality of core wires parallel to each other is illustrated in the present embodiment, the flat cable 2 may have an arbitrary cross-sectional shape, and an appropriate configuration of the core wires and the insulating covers can be selected. Also, although a case of using one flat cable 2 is illustrated in the present embodiment, the two or more flat cables 2 may be piled and used.

Figure 1:
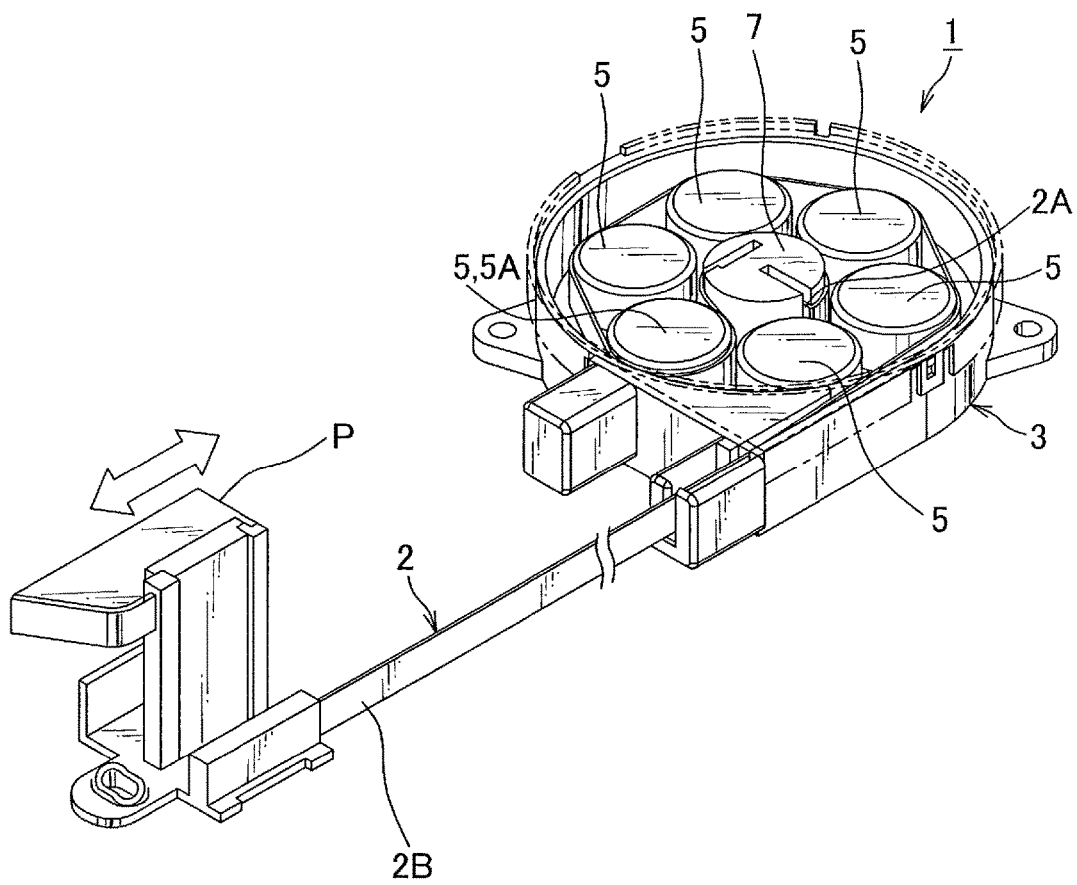
FIG. 1 is a perspective view illustrating an embodiment of a flat cable reeling device according to the present invention.
Figure 2:
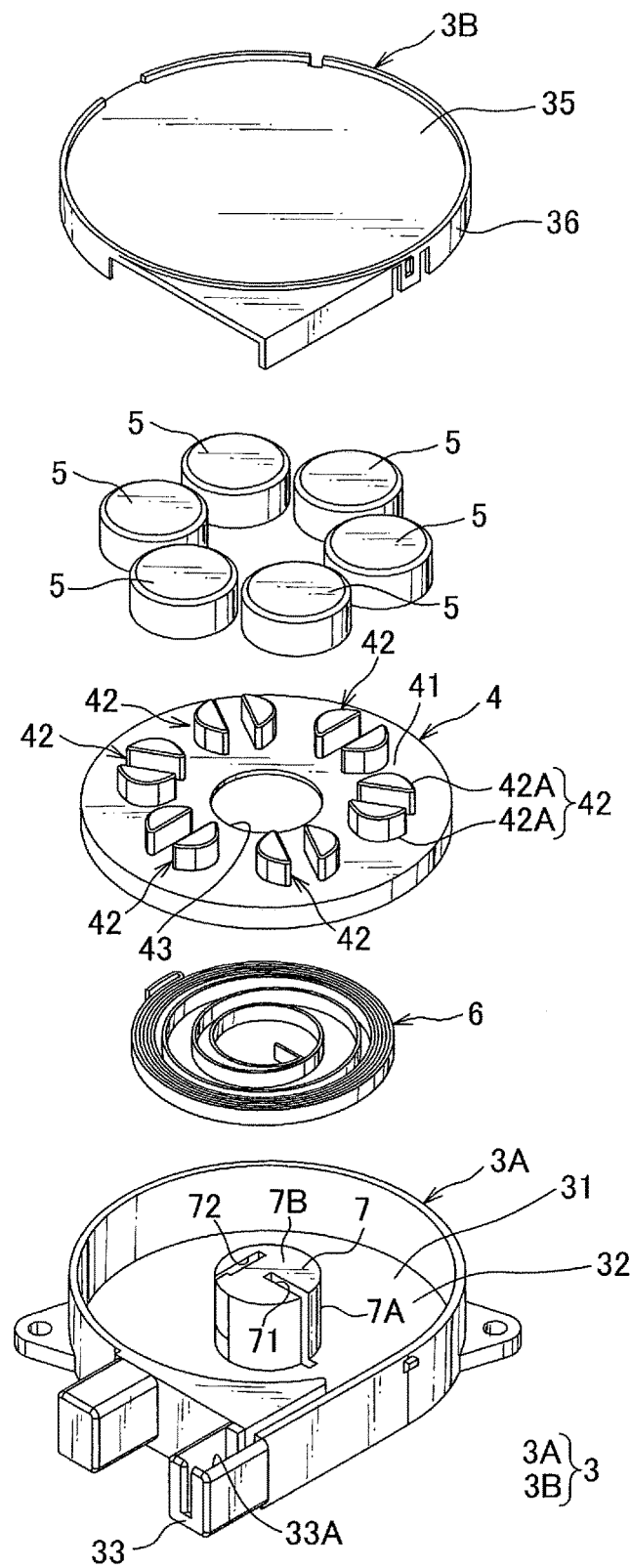
FIG. 2 is an exploded perspective view illustrating the flat cable reeling device illustrated in FIG. 1.

As illustrated in FIGS. 1 and 2, the flat cable reeling device 1 includes a case 3 housing the reeled flat cable 2, a rotating table 4 turnably provided in this case 3, a plurality of (in the present embodiment, six) rollers 5 rotatively supported on this rotating table 4, and a spiral spring 6 serving as a biasing means biasing the rotating table 4 in a reeling direction R of the flat cable 2. The case 3 includes a lower case 3A housing the rotating table 4 and the spiral spring 6 and an upper case 3B covering an upper surface side of this lower case 3A to close the case 3 in a hollow-centered manner, and approximately at a center portion in the lower case 3A, a center shaft 7 turnably and pivotally supporting the rotating table 4 is erected.

As illustrated in FIG. 2, the lower case 3A is configured to include a bottom portion 31 installed flatly on the floor of the vehicle and opposed to this floor, a circumferential wall 32 erected approximately in a cylindrical shape along an outer circumference of this bottom portion 31, and a cable leading portion 33 adapted to lead the second end side of the flat cable 2 outside. The upper case 3B is configured to include a ceiling portion 35 formed approximately in a disk shape and a pendent wall 36 pendent approximately in a cylindrical shape along an outer circumference of this ceiling portion 35 and overlapping with the circumferential wall 32 of the lower case 3A.

As illustrated in FIG. 2, the center shaft 7 is erected on an inner surface of the bottom portion 31 of the lower case 3A, is formed entirely approximately in a columnar shape, and turnably supports the rotating table 4 by means of a circumference 7A thereof. This center shaft 7 is provided with a slit 71 cut from the circumference 7A toward a center and opened to an upper surface 7B and a retaining groove 72 cut in a direction perpendicular to this slit 71 and opened to the upper surface 7B. The slit 71 lets the first end side 2A of the flat cable 2 pass therethrough and retains the first end side 2A. The first end side 2A of the flat cable 2 passes through the slit 71, is inserted in a through hole communicating with the slit 71 and penetrating the bottom portion 31 of the lower case 3A, is led out of the lower case 3A, and is then connected with the connector or the like on the floor side.

As illustrated in FIG. 2, the cable leading portion 33 is provided to project from an outer surface of the circumferential wall 32 of the lower case 3A and is provided on an upper surface thereof with a groove portion 33A adapted to house the flat cable 2. The groove portion 33A is provided to let an inside of the lower case 3A communicate with an outside of the lower case 3A and to extend linearly along a sliding direction of the protector P. The flat cable 2 passes through the groove portion 33A to cause the second end side 2B of the flat cable 2 to be routed over the inside and the outside of the case 3. Also, when the flat cable 2 is reeled or unreeled into or out of the case 3, the flat cable 2 is guided along the groove portion 33A.

As illustrated in FIG. 2, the rotating table 4 is configured to integrally include a table main body 41 formed in a disk shape and a plurality of (in the present embodiment, six) guiding portions 42 provided on an upper surface of this table main body 41 and respectively rotatively supporting the plurality of rollers 5. At a center position of the table main body 41, a hole portion 43 is formed to let the center shaft 7 pass therethrough.

As illustrated in FIG. 2, the plurality of guiding portions 42 are formed to project from the upper surface of the table main body 41 and are arranged at regular intervals along a circumferential direction of the table main body 41. Here, the projecting direction of the guiding portions 42 represents an up-down direction and a height direction of the flat cable reeling device 1.

Figure 4:
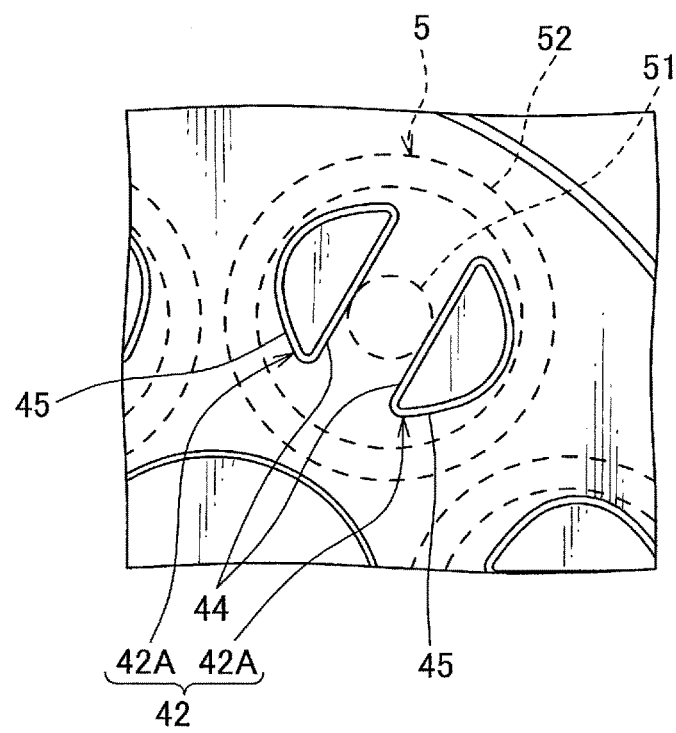
FIG. 4 is an enlarged plan view illustrating a main part of the flat cable reeling device illustrated in FIG. 1.

Also, as illustrated in FIG. 4, each of the plurality of guiding portions 42 is configured to include a pair of supporting portions 42A letting each roller 5 rotatable and supporting the roller 5 to be slidable in a radial direction of the table main body 41. Each of the supporting portions 42A as the pair is formed in a pillared shape whose top is formed in a semi-circular shape and includes an opposed surface 44 opposed to be spaced in a direction perpendicular to the radial direction of the table main body 41 and a sliding surface 45 constituting a curved surface continuing between side edges of this opposed surface 44 and sliding on an inner circumferential surface of the roller 5. A pair of opposed surfaces 44 is provided to extend in a direction parallel to the radial direction of the table main body 41, a separating dimension between the supporting portions 42A as the pair, that is, a separating dimension between the opposed surfaces 44, is formed to be approximately equal to a diameter dimension of a shaft portion 53 of the roller 5, a dimension in an extending direction of the opposed surface 44 is formed to be longer than an inside diameter dimension of the roller 5, and a maximum dimension in an opposed direction of the guiding portion 42, that is, a maximum dimension between the sliding surfaces 45, is formed to be approximately equal to the inside diameter dimension of the roller 5. In a state in which the shaft portion 53 of the roller 5 is inserted between the opposed surfaces 44, the shaft portion 53 or the roller 5 is provided to be rotatable and slidable in the radial direction of the table main body 41.

Figure 3:
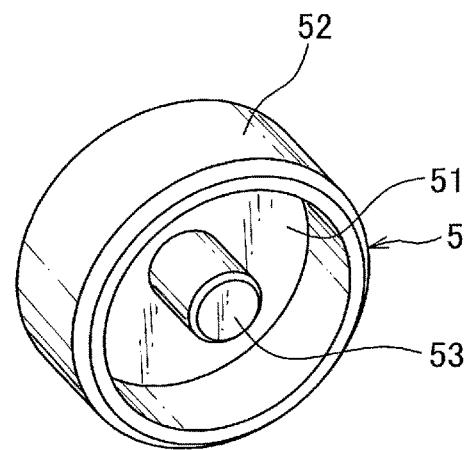
FIG. 3 is a perspective view illustrating a backside of a roller constituting the flat cable reeling device illustrated in FIG. 2.

As illustrated in FIGS. 2 and 3, each of the plurality of rollers 5 is configured to integrally include a disk portion 51, a circumferential wall 52 erected in a cylindrical shape from a circumference of this disk portion 51, and the shaft portion 53 erected in a columnar shape from the disk portion 51 in the same direction as that of the circumferential wall 52. This circumferential wall 52 is formed to have a smaller curvature than that of the sliding surface 45 of the guiding portion 42. Each of the plurality of rollers 5 has the shaft portion 53 thereof inserted between the supporting portions 42A as the pair to be supported by the pair of supporting portions 42A, and the flat cable 2 is wound along outer circumferences of the plurality of rollers 5. Also, one of the plurality of rollers 5 serves as an inverting roller 5A (illustrated in FIG. 1) inverting the flat cable 2 led inside the case 3 from the groove portion 33A toward the center shaft 7.

The spiral spring 6 is formed by winding a flexible metal in a spiral shape. This spiral spring 6 has an end portion thereof on a center side inserted and fixed in the retaining groove 72 of the center shaft 7 and has an end portion thereof on an outer circumferential side retained on a lower surface of the rotating table 4 to bias the rotating table 4 in the reeling direction R of the flat cable 2. That is, by winding the flat cable 2 inverted on the inverting roller 5A around the outer circumferences of the plurality of rollers 5 after rotating the rotating table 4 in a reverse direction of the reeling direction R as many times as a predetermined number to store a biasing force in the spiral spring 6, the rotating table 4 is biased in the reeling direction R by a restoring force of the spiral spring 6, and this biasing force causes the flat cable 2 to be reeled on the center shaft 7 and the rotating table 4.

Next, operations of the flat cable reeling device 1 will be described. The flat cable 2 has the first end side thereof retained in the slit 71 and wound along the circumference 7A of the center shaft 7, is inverted on the inverting roller 5A, and is led outside the case 3 from the groove portion 33A. Subsequently, when the rotating table 4 is rotated in the reeling direction R by the restoring force of the spiral spring 6 as described above, the flat cable 2 is reeled on the outer circumference of the center shaft 7 and the outer circumferences of the plurality of rollers 5 of the rotating table 4. From this reeled state, the flat cable 2 is led out and fed from the outer circumference of the center shaft 7 to the outer circumferences of the plurality of rollers 5 to be sequentially unreeled outside the case 3.

Figure 5:
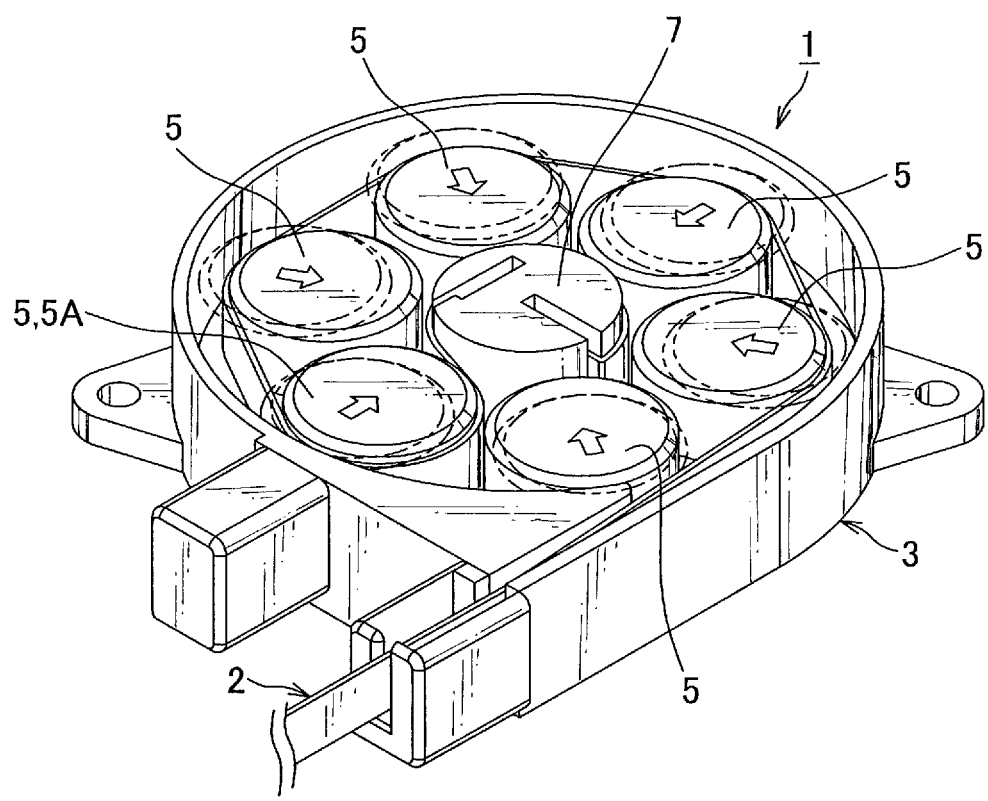
FIG. 5 describes operations of the flat cable reeling device illustrated in FIG. 1.
Figure 6A:
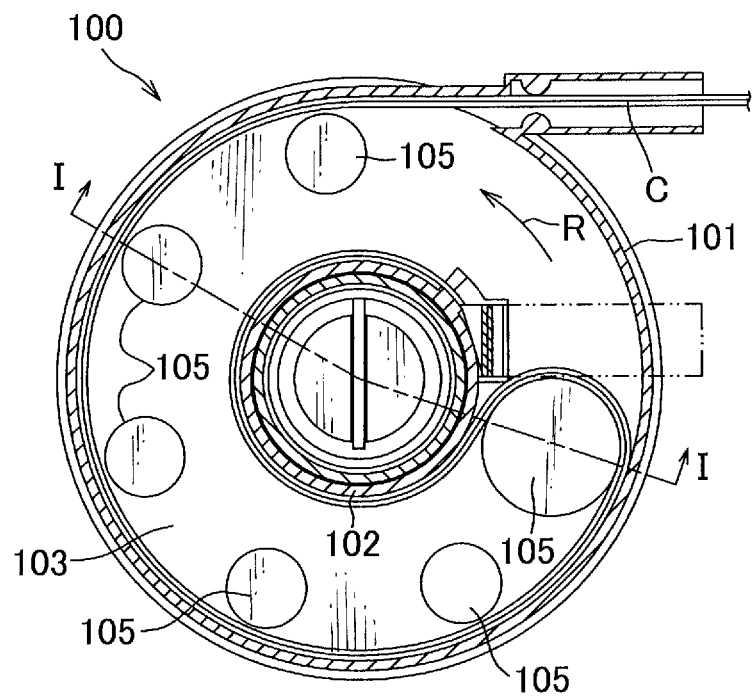
FIG. 6A is a plan view illustrating a conventional reeling device described in Patent Literature 1.
Figure 6B:
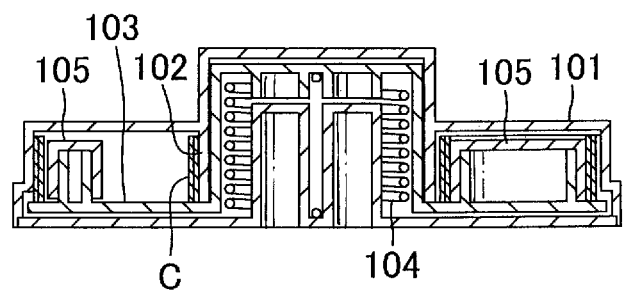
FIG. 6B is a cross-sectional view along the line I-I in FIG. 6A.

Specifically, as illustrated in FIG. 5, when the flat cable 2 is reeled, the plurality of rollers 5 are pressed by the flat cable 2, are moved inward in the radial direction of the rotating table 4, and are thrusted on the circumference of the center shaft 7. Since the flat cable 2 is wound around the center shaft 7 in this state, slack of the flat cable 2 generated around the center shaft 7 can be restricted. Also, when the flat cable 2 is unreeled, the rollers 5 are rotated while feeding the flat cable 2, and the flat cable 2 unwound around the circumference 7A of the center shaft 7 is forcibly fed to the side of the outer circumferences of the rollers 5. This can restrict slack of the flat cable 2 generated on the circumference 7A of the center shaft 7.

In such a flat cable reeling device 1, the rotating table 4 is provided with the disk-like table main body 41 and the plurality of guiding portions 42 formed to project from the upper surface of the table main body 41 at the respective positions at which the respective rollers 5 are arranged, the table main body 41 is provided with the plurality of rollers 5, adapted to reel the flat cable 2 from the outside of the case, arranged along the circumferential direction of the table main body 41, and the plurality of guiding portions 42 rotatively support the respective rollers 5 and guide the respective rollers 5 to be slidable in the radial direction of the rotating table 4. Accordingly, size reduction of the flat cable reeling device 1 in the up-down direction can be achieved.

Meanwhile, although each of the supporting portions 42A as the pair includes the opposed surface 44 and the sliding surface 45 and is formed in a block shape in the aforementioned embodiment, the present invention is not limited to this, and the supporting portion 42A may be an erected plate erected from the table main body 41 and having the opposed surface 44. In this case, the sliding surface 45 may be omitted.

Also, the aforementioned embodiment merely illustrates a representative mode of the present invention, and the present invention is not limited to the embodiment. Thus, the present invention can be altered in various ways and carried out without departing from the scope of the present invention.

REFERENCE SIGNS LIST

1 Flat cable reeling device
2 Flat cable
3 Case
4 Rotating table
5 Roller
6 Spiral spring (biasing means)
7 Center shaft
41 Table main body
42 A plurality of guiding portions

The invention claimed is:

1. A flat cable reeling device reeling a first end side of a flat cable and leading out a second end side thereof, comprising:
 a case housing the flat cable;
 a center shaft provided in the case and fixing the first end side of the flat cable;
 a rotating table rotatively provided, centering on the center shaft;
 a plurality of rollers adapted to reel the flat cable from an outside of the case; and
 a biasing means biasing the rotating table in a reeling direction of the flat cable, wherein
 the rotating table is integrally provided with a disk-like table main body and a plurality of guiding portions formed to project from an upper surface of the table main body,
 the table main body is provided with the plurality of rollers adapted to reel the flat cable from the outside of the case arranged along a circumferential direction of the table main body, and
 the plurality of guiding portions are provided at respective positions at which the respective rollers are arranged, rotatively support the respective rollers, and guide the respective rollers to be slidable in a radial direction of the rotating table.

2. The flat cable reeling device according to claim 1, wherein each of the rollers integrally includes a shaft portion as a rotation center,
 each of the guiding portions includes a pair of supporting portions inserting the shaft portion therebetween and rotatively supporting the shaft portion, and
 the pair of supporting portions is provided to extend in a direction parallel to the radial direction of the rotating table.

3. The flat cable reeling device according to claim 2, wherein the roller is configured to integrally include a disk portion, a circumferential wall erected in a cylindrical shape from a circumference of the disk portion, and the shaft portion erected in a columnar shape from the disk portion in the same direction as that of the circumferential wall, and each of the supporting portions as the pair includes an opposed surface opposed in a direction perpendicular to the radial direction of the rotating table and inserting the shaft portion therebetween and an arc-like sliding surface provided to continue into the opposed surface and sliding on an inner circumferential surface of the circumferential wall.

* * * * *